Oct. 19, 1954
F. R. MILSOM
SERVO SYSTEM INCORPORATING ELECTRIC MOTOR AND AMPLIFIER CIRCUITS
Filed June 23, 1948
2,692,356
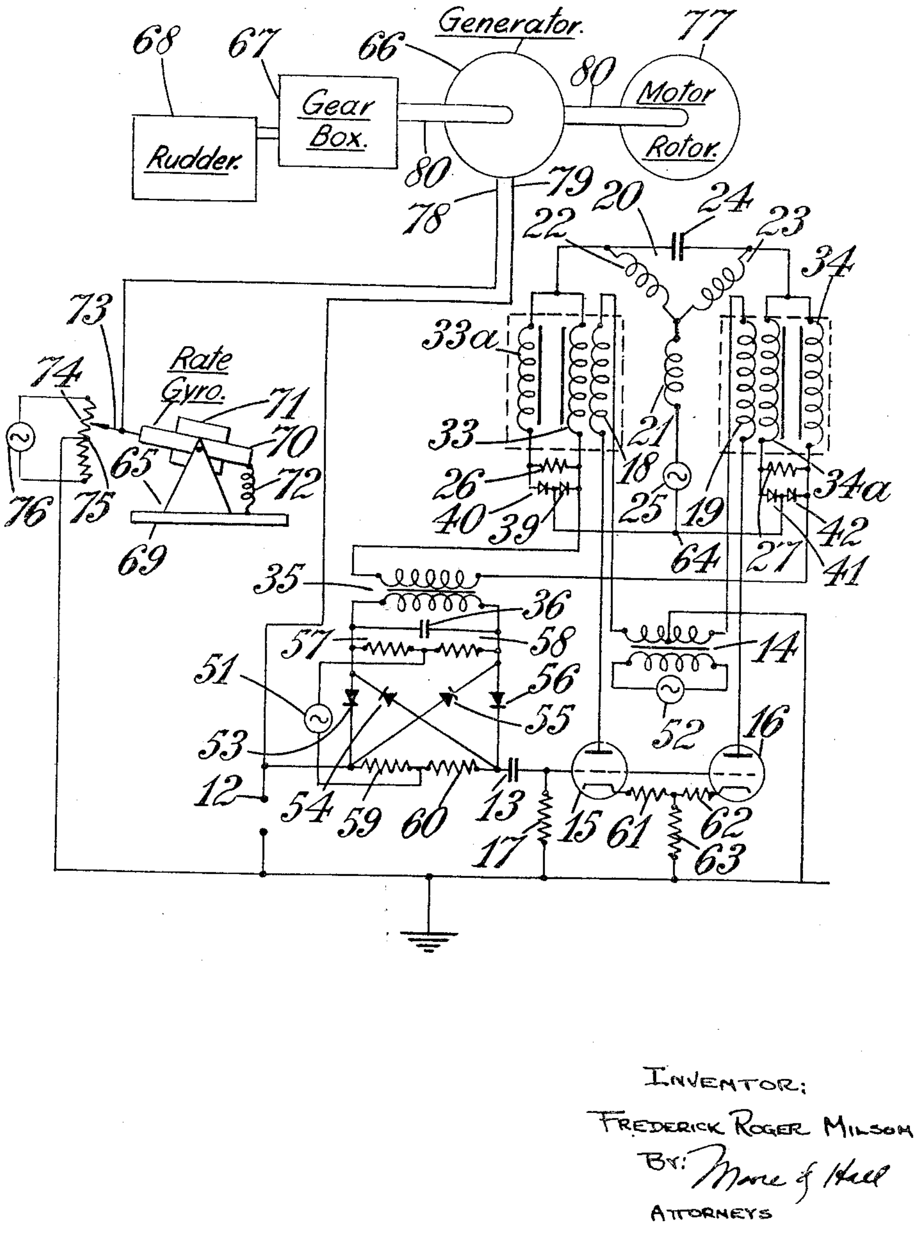
INVENTOR:
FREDERICK ROGER MILSOM
BY: Morse & Hall
ATTORNEYS Patented Oct. 19, 1954

2,692,356

UNITED STATES PATENT OFFICE 2,692,356

SERVO SYSTEM INCORPORATING ELECTRIC MOTORS AND AMPLIFIER CIRCUITS

Frederick Roger Milsom, Boreham Wood, England, assignor to S. Smith & Sons (England) Limited, London, England, a British company, and Furzehill Laboratories Limited, Boreham Wood, England, a British company Application June 23, 1948, Serial No. 34,674

13 Claims. (Cl. 318—18)

This invention relates to improvements in automatic control systems of the type which comprise an instrument responsive to the change or rate of change of a condition of a body and giving an electrical signal in accordance with such change or rate of change, an amplifier for amplifying such a signal and means for varying the condition in accordance with the output from the amplifier, to maintain a datum condition. A control system of this type is described in patent application Serial Numbers 655,684 and 658,614 to which reference is made for structural details used in connection with the present system such as generators, gear boxes, rudder, rate gyro and the like.

In order that the datum condition may be restored as quickly and accurately as possible when displaced by a sustained or transient disturbance it is necessary that an amplifier of as high a gain as possible is used. On the other hand, if the control system has inherent time lags, as is usually the case, a high amplifier gain may lead to a condition of sustained oscillation or "hunting."

It is an object of the present invention to provide a compromise in which the long term stiffness (that is a large restoring force for a small sustained disturbance) is achieved by means of a high amplifier gain in the long term, whilst at the same time the amplifier gain is effectively reduced for short term disturbances, thus avoiding a condition of "hunting."

According to the present invention an automatic control system of the type referred to comprises means for varying the effective gain of the amplifier in accordance with the rate of change of the input signal, whereby the rate of change of the output signal is reduced in comparison with the rate of change of the input signal.

In a preferred form of the invention a part of the output signal from the amplifier is applied to a device producing a voltage in accordance with the rate of change of amplifier output and the output from the device is applied to the input of the amplifier, in such a manner as to offset the input signal.

The means for varying the condition may be controlled by a three-phase A. C. electric motor, exerting a torque in accordance with the output of the amplifier. Thus the motor may have one of its phase-windings connected to one side of a single-phase A. C. supply, a phase splitting condenser connected between the ends of the remaining two windings, two variable impedances respectively between each of the two terminals of the phase-splitting condenser and the other side of the single phase A. C. supply, the values of the said impedances being controlled by the output of the said amplifier, whereby the motor generates a torque in accordance with the difference between the currents in the said impedances. According to this invention means may be provided for obtaining a signal in accordance with the rate of change of the difference between the said currents and together with means for applying the said signal to the amplifier input in such a manner as to offset the input signal.

An embodiment of the invention will now be described with reference to the accompanying drawing which is a diagram of an automatic control system of the type referred to in which the controlling signal is an A. C. voltage, the system being used for the automatic control of the rudder of an aircraft.

An A. C. signal at a constant frequency (the reference frequency) and of definite phase (the reference phase) is applied between terminal 12 and earth. This signal is applied, in series with the output from the ring modulator which comprises the dry-plate rectifier elements 53, 54, 55 and 56 and the resistors 57, 58, 59, 60 and the purpose of which will be considered later, through a condenser 13 and grid leak 17 to the grids of valves 15 and 16, the said grids being strapped together. Bias for these valves is provided by the resistors 61, 62, 63. The primary of a transformer 14 is supplied from source 52 with an A. C. voltage of constant amplitude in the reference phase and at the reference frequency the secondary of the transformer has its centre-tap connected to earth while its ends are connected, through coils 18 and 19 respectively, to the anodes of valves 15 and 16. Coils 18 and 19 constitute the control windings of a transductor system controlling a motor 20 which is a servo motor controlling the rudder and thus the rate of turn of the aircraft. The motor 20 is conveniently of the type described in British specifications Nos. 576,248 and 576,249 and comprises three phase windings 21, 22, 23 in star connection. Phase windings 21, 22 and 23 are joined at a common junction as is usual with star connected polyphase motors. The opposite ends of the phase windings 21, 22 and 23 are normally brought out to terminals on the motor frame for connection to three phase power supply and are termed "free ends." Thay may also be called external terminals. A condenser 24 is connected between the external terminals of windings 22 and 23. The external terminal of winding 21 is connected to one terminal of an A. C. generator 25. The other terminal of the generator, terminal 64, is connected through rectifiers 39 and 40 and inductances 33 and 33A to the external terminal of motor winding 22 and through rectifiers 41 and 42 and inductances 34 and 34A to the external terminal of motor winding 23. Inductances 33, 33A, 34, 34A constitute the power windings of the transductor system of which coils 18 and 19 constitute the control windings. It will be seen that rectifiers 39 and 40 are conductive for alternate half cycles of the voltages from generator 25, as are rectifiers 41 and 42. A resistance 26 is connected between the ends of inductances 33 and 33A connected to rectifiers 39 and 40, while a resistance 27 is connected similarly with respect to inductances 34, 34A and rectifiers 40, 41, the current through winding 33 thus has a D. C. component, and that through windings 33*a* an equal and opposite D. C. component. These D. C. components are substantially proportional to the A. C. current between terminal 64 and the junction of winding 22 and condenser 24. Similarly, there are equal and opposite D. C. components of current through windings 34 and 34*a*. The D. C. components of current passing through the ohmic resistance of these windings will thus produce a D. C. potential difference between the ends of the two windings connected to rectifiers 39 and 42 respectively. There is no D. C. component of current between the junction of windings 33 and 33*a*, and that of 34 and 34*a*, as these junctions will be at the same D. C. potential. The primary of a transformer 35 is connected between one end of each of resistances 26 and 27. The current through the primary is thus in accordance with the difference of the mean currents between terminals 64 and the ends of motor windings 22 and 23 i. e. it is in accordance with the output from the amplifier. A condenser 36 is connected across the secondary of transformer 35. A voltage is thus generated across the secondary of the transformer in accordance with the rate of change of the difference between the mean currents between terminal 64 and the ends of motor windings 22 and 23 respectively. This voltage is applied to the input of a conventional ring modulator comprising half wave rectifiers 53, 54, 55, 56 and resistors 57, 58, 59, 60. An A. C. voltage of constant amplitude at the reference frequency and phase is supplied by the source 51 and is applied to the A. C. input of the modulator. There is thus developed at the output of the modulator an A. C. signal modulated in accordance with the above-mentioned difference in currents. This output is connected, as mentioned earlier, in series with the input signal to the whole device.

The input, applied to terminals 12, consists of the output from rate of turn gyroscope 65 connected in series with the output of a tachometric generator 66.

Rate of turn gyroscope 65 comprises a base 69, mounted horizontally in the aircraft. Upon this base is mounted a gimbal ring 70 carrying the gyroscope rotor 71. The gimbal ring is pivoted about an axis parallel to the fore and aft axis of the aircraft and is constrained by the spring 72 to remain normally in a horizontal position. The gyroscope rotor 71 rotates about an axis which is normally horizontal and at right angles to the fore and aft axis of the aircraft. Gimbal ring 70 carries an insulated slider 73, moving over an arcuate resistor 74 fixed to the base 69, the slider 73 resting on the centre point 75 of this resistor 74 when the ring 70 is horizontal. The ends of resistor 74 are connected to the A. C. source 76 the output of which is in phase with the outputs from the sources 25, 51 and 52. On the occurrence therefore of a turn in yaw of the aircraft, the gyroscope will precess against the spring 72 and a voltage in the reference phase (or in anti-phase with this) will be produced between slider 73 and centre tap 75, which is proportional to the rate of turn in yaw of the aircraft, and of one phase or the other in accordance with the direction of the yaw. Centre tap 75 is connected to earth.

Generator 66 is driven by the rotor 77 of motor 20, by means of shaft 80, producing an output voltage between terminals 78 and 79 in the reference phase or in anti-phase therewith, dependent upon the direction of rotation of motor 20, of magnitude proportional to the speed of motor 20. Motor 20 drives, through shaft 80 and gear box 67, the rudder 68 of the aircraft. Terminal 79 is connected to one input terminal 12 and terminal 78 is connected to the slider 73. The connections are such that the voltage between terminals 78 and 79 opposes the output from gyroscope 65. The servo system operates in a well known manner to reduce the input to the amplifier (at terminal 12) substantially to zero, so that on the occurrence of a disturbance of the aircraft in yaw, the rudder is operated at a rate substantially proportional to the rate of yaw and the disturbance is rapidly corrected. The action of the system, by co-operation of gyro 65, motor 20 and generator 66 is known and the use of the present invention in conjunction with this known system will now be described.

Suppose a signal of constant amplitude is supplied between terminal 12 and earth. If the signal amplitude is zero equal current pulses will flow on alternate half cycles through windings 18 and 19, i. e. the D. C. currents through these windings will be equal. Now suppose a non-zero signal is applied which we may suppose for definiteness is in phase with the voltage at the anode of valve 15. The D. C. current through coil 18 will then increase while that through coil 19 will decrease, and the difference between these currents will be proportional to the amplitude of the input signal.

The current through coils 18 and 19 controls the impedances of variable inductances 33, 33A and 34, 34A respectively and hence the impedances of the circuits between terminal 64 and the external terminals of the motor windings 22 and 23 respectively, these impedances being equal when the currents in coils 18 and 19 are equal. Thus on application of a signal between terminal 12 and earth the magnitude of the currents which flow from the terminal 64 to the free ends or external terminals of windings 22, 23 is varied and the motor generates a torque in accordance with the difference between these currents. This torque is applied to means which operate to restore the condition whose variation gave rise to the signal to its datum position, that is, it is applied through the gear box 67 to the rudder 68 to reduce the rate of turn of the craft producing the original input signal to zero.

When a steady input signal has been applied for some time there will be no change in the current flowing in the primary of transformer 35, so no signal will appear across the output terminals of the ring modulator. The full amplifier gain will thus be effective in maintaining the desired long-term stiffness. Varying input signals will however produce a voltage across the secondary of transformer 35 proportional to the rate of change of input voltage and this voltage, when remodulated, is applied in series with the input in such a sense as to oppose the input signal. The effective gain and hence the stiffness is thus reduced for varying input signals. Similarly since the effective gain is reduced for rapidly oscillating signals the tendency to "hunt" is also reduced.

I claim:

1. In an automatic control system for maintaining the condition of a body at a datum value comprising an instrument responsive to a function with respect to time of the change of the condition and giving an electric signal in accordance with said function, an amplifier for amplifying said signal, and means for varying the condition in accordance with the output from the amplifier; an electric motor controlling said means for varying the condition; a plurality of saturable reactors having power coils comprising variable inductances controlled by the output from said amplifier connected in series with two control phase-windings of said motor whereby the currents through said windings and hence the torque of the motor is dependent upon the output from said amplifier, means for obtaining a signal in accordance with the rate of change in the difference in said windings said signal varying according to the rate of change of the output of said amplifier and means for applying the signal so obtained to the amplifier input in opposition to the input signal derived from said instrument.

2. In an automatic control system for maintaining the condition of a body at a datum value comprising an instrument responsive to a function with respect to time of the change of the condition giving an electrical signal in accordance with said function, an amplifier for amplifying said signal and means for varying the condition in accordance with the output from the amplifier; an A. C. electric motor controlling said means for varying the condition having one of its phase-windings connected to one side of a single phase A. C. supply, a plurality of saturable reactors each having a power coil comprising a variable impedance connected between each of the other windings and said supply, the values of said impedances being controlled by the output of the amplifier, means for applying to the primary winding of a transformer a signal in accordance with the rate of change in the difference in the currents through the variable impedances and means for applying to the input of the amplifier a signal dependent on the voltage across the secondary winding of the transformer and varying in response to the rate of change of the output of said amplifier as negative feedback acting in opposition to the signal derived from said instrument.

3. In an automatic control system for maintaining the condition of a body at a datum value comprising an instrument responsive to a function with respect to time of the change of the condition and giving an electrical A. C. of an amplitude in accordance with said function, an amplifier for amplifying said signal and means for varying the condition in accordance with the output from said amplifier; an A. C. electric motor controlling said means for varying the condition having one of its phase-windings connected to one side of a single-phase A. C. supply, a plurality of saturable reactors each having a power coil comprising a variable impedance connected between each of the other windings and said supply, the values of said impedances being controlled by the output of the amplifier, means for applying to the primary winding of a transformer a signal in accordance with the difference in the currents through the variable impedances and varying in accordance with the rate of change of the output of said amplifier, means for modulating the voltage across the secondary of said transformer with an A. C. voltage of the same frequency as the A. C. signal derived from said instrument and means for applying the modulated signal so obtained to the input of said amplifier in antiphase with the A. C. signal derived from said instrument.

4. In combination, an amplifier for controlling the supply of electricity from an A. C. source to the stator of an A. C. motor in accordance with an input signal, said stator having three terminals, first and second variable impedances connected respectively between first and second terminals of said stator and a first terminal of said source, the second terminal of said source being connected to the third terminal of said stator, phase shifting means connected between the first and second stator terminals, means to vary said first and second variable impedances in opposite senses in accordance with said input signal, means for producing a further signal in accordance with the rate of change of the difference between the currents in said first and second impedances and varying in accordance with the rate of change of the output of said amplifier, said further signal being applied to said amplifier as negative feedback acting in opposition to the input signal to reduce the response of the amplifier to rapidly varying input signals as compared with its response to slowly varying input signals.

5. In combination, an amplifier for controlling the supply of electricity from an A. C. source to the stator of a polyphase A. C. motor in accordance with an input signal, said stator having three terminals, first and second saturable reactors having power and control windings, said power windings being connected between the first terminal of said source and the first and second stator terminals of said motor, respectively, the second terminal of said source being connected to the third terminal of said stator and a condenser connected between the first and second stator terminals, the currents in said control windings being varied in opposite senses to vary in opposite senses the impedances of said power windings in accordance with the input signal, means to generate first and second direct currents, in accordance with the A. C. currents through the first and second power windings respectively, means to generate a further signal in accordance with the rate of change of the difference between said first and second direct currents, said further signal being applied to said amplifier in opposition to the input signal to reduce the response of the amplifier to rapidly varying input signals as compared with its response to slowly varying input signals.

6. An amplifier for controlling the supply of electricity from an A. C. source to the three terminal stator of a polyphase A. C. motor, in accordance with an A. C. input signal of variable amplitude and of a certain phase taken from a group comprising a reference phase and an anti-phase thereof, comprising similar first and second saturable reactors having power and control windings, said power windings being connected between the first terminal of said source and first and second stator winding terminals respectively, the second terminal of said source being connected to the third terminal of said stator winding and a condenser being connected between the first and second stator winding terminals, phase sensitive rectifier means to combine the input signal with an A. C. signal of constant amplitude in the reference phase to give first and second direct control currents, the difference between said currents being in accordance with the magnitude and phase of the input signal, and said first and second control currents flowing in the first and second control windings to vary in opposite senses the impedances of said first and second power windings, rectifier means to generate first and second direct currents in said first and second power windings, a transformer through whose primary flows a direct current in accordance with the difference between said first and second direct currents, a modulator wherein the voltage across the secondary of said transformer is combined with a signal of constant amplitude in the reference phase to give a further A. C. signal in the reference phase (or in anti-phase therewith), said further A. C. signal being applied in opposition to the input signal to reduce the response of the amplifier to input signals of rapidly varying amplitude as compared with its response to input signals of slowly varying amplitude.

7. An amplifier for controlling the supply of electricity from an A. C. source to the stator winding of an A. C. motor, said stator winding having three terminals, in accordance with an A. C. input signal of variable amplitude and of a certain phase, the reference phase, or in anti-phase therewith, comprising similar first and second saturable reactors having power and control windings, said power windings being connected between the first terminal of said source and first and second stator winding terminals respectively, the second terminal of said source being connected to the third terminal of said stator winding and a condenser being connected between the first and second stator winding terminals, two similar thermionic valves each having a cathode, grid and anode, a power transformer having a primary supplied with current in the reference phase and a centre tapped secondary, the centre tap being connected to the cathodes of the therminonic valves, the ends of the secondary being connected respectively through the first and second control windings to the anodes of the first and second valves, the grids of the valves being connected together and the input signal being applied between the grids of the valves and the centre tap to produce first and second control currents in first and second control windings, the difference between said first and second control currents being in accordance with the input signal, rectifier means to generate first and second direct currents in accordance with the alternating currents in the first and second power windings, transformer through whose primary flows a direct current in accordance with the difference between the said first and second direct currents, a modulator wherein the voltage across the secondary of said transformer is combined with a signal of constant amplitude in the reference phase to give a further A. C. signal in the reference phase or in anti-phase therewith, said further A. C. signal being applied in opposition to the input signal to reduce the response of the amplifier to input signals of rapidly varying amplitude as compared to its response to input signals or slowing varying amplitude.

8. In an automatic control system for maintaining the condition of a body at a datum value, the combination of an instrument giving a first electric signal in accordance with variation of said condition from the datum, an electric motor adapted to control said condition, the stator of said motor having three terminals and being supplied from a source of electric current, first and second variable impedances connected respectively between the first and second terminals of said stator and the first terminal of said source, the second terminal of said source being connected to the third terminal of said stator, an electric tachometric signal generator driven by said motor and giving a second electric signal proportional to the speed of said motor, means to combine said first and second signals in opposition to give an input signal, means to vary said first and second varible impedances in opposite senses in accordance with said input signal to cause the motor to be energised to counteract variation of the condition from the datum and means to produce a further signal in accordance with the rate of change of the difference between the currents in said first and second impedances, said further signal being applied in opposition to the input signal to reduce the response of the system to rapidly varying input signals as compared with its response to slowly varying input signals.

9. In an automatic control system for a moving craft, the combination of an instrument giving a first electrical signal in accordance with rate of turn of the craft about a control axis, an electric motor adapted to actuate a control surface to control the craft about said axis, said motor having three terminals and being supplied from a source of electric current, first and second variable impedances connected respectively between the first and second terminals of said stator and the first terminal of said source, the second terminal of said source being connected to the third terminal of said motor, an electric tachometric signal generator driven by said motor and giving a second electric signal proportional to the speed of said motor, means to combine said first and second signals in opposition to give an input signal, means to vary said first and second variable impedances in opposite senses in accordance with said input signal to cause the motor to be energised to actuate the control surface to counteract the rate of turn giving rise to the first signal, and means to produce a further signal in accordance with the rate of change of the difference between the currents in said first and second impedances, said further signal being applied in opposition to the input signal to reduce the response of the system to rapidly varying input signals as compared with its response to slowly varying input signals.

10. The combination as claimed in claim 9 wherein the electric motor is a 3-phase wound A. C. motor, the source is an A. C. source and phase splitting means are connected between the first and second motor terminals.

11. The combination as claimed in claim 10 first and second saturable reactors having power windings comprising said first and second variable impedances.

12. The combination as claimed in claim 11 wherein the first and second signals are A. C. signals in a fixed phase, the reference phase, and the means for varying the impedances of the power windings of the saturable reactors comprise first and second control windings, first and second similar thermionic valves, a transformer having a centre-tapped secondary winding and a primary connected to a reference phase A. C. supply, the first terminal of the centre-tapped secondary being connected through the first control winding to the anode of the first thermionic valve, the second terminal of the centre-tapped secondary being connected through the second control winding to the anode of the second thermionic valve, the cathodes of the thermionic valves being connected together to the centre-tap of the transformer secondary, the grids being connected together and the input signal being applied to the grids.

13. The combination as claimed in claim 12 wherein the means to produce the further signal comprise means to generate first and second direct currents respectively in accordance with the currents in the power windings of said first and second reactors, a further transformer, to the primary of which is applied a current in accordance with the difference between said first and second direct currents and across the secondary of which appears a voltage in accordance with the rate of change of said difference, and a modulator so connected that the voltage across said secondary of said further transformer modulates a reference phase voltage to give the further signal.

References Cited in the file of this patent

UNITED STATES PATENTS

| Number | Name | Date |
|---|---|---|
| 1,955,322 | Brown | Apr. 17, 1934 |
| 2,209,369 | Wills | July 30, 1940 |
| 2,310,955 | Hornfeck | Feb. 16, 1943 |
| 2,351,977 | Kronenberger et al. | June 20, 1944 |
| 2,352,103 | Jones | June 20, 1944 |
| 2,401,168 | Kronenberger | May 29, 1946 |
| 2,414,430 | Nisbet | June 14, 1947 |
| 2,466,687 | Craddock et al. | Apr. 12, 1949 |